United States Patent
Du et al.

(10) Patent No.: US 8,570,902 B2
(45) Date of Patent: Oct. 29, 2013

(54) METHOD AND TERMINAL FOR SELECTING RANDOM ACCESS RESOURCE

(75) Inventors: Zhongda Du, Shenzhen (CN); Rui Ma, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 139 days.

(21) Appl. No.: 13/203,446

(22) PCT Filed: Sep. 25, 2009

(86) PCT No.: PCT/CN2009/074208
§ 371 (c)(1),
(2), (4) Date: Aug. 25, 2011

(87) PCT Pub. No.: WO2010/105472
PCT Pub. Date: Sep. 23, 2010

(65) Prior Publication Data
US 2012/0063393 A1  Mar. 15, 2012

(30) Foreign Application Priority Data
Mar. 16, 2009 (CN) .......................... 2009 1 0118789

(51) Int. Cl.
*H04L 12/28* (2006.01)
(52) U.S. Cl.
USPC ............................ 370/254; 370/255; 370/465
(58) Field of Classification Search
None
See application file for complete search history.

(56) References Cited

U.S. PATENT DOCUMENTS

| | | | |
|---|---|---|---|
| 4,661,952 A * | 4/1987 | von Sichart et al. .......... | 370/460 |
| 7,376,119 B2 | 5/2008 | Cheng | |
| 2004/0213199 A1 | 10/2004 | Cheng | |
| 2008/0225802 A1 | 9/2008 | Sun et al. | |
| 2009/0239566 A1 * | 9/2009 | Pelletier et al. ................ | 455/517 |
| 2012/0063393 A1 * | 3/2012 | Du et al. ....................... | 370/329 |

FOREIGN PATENT DOCUMENTS

| | | |
|---|---|---|
| CN | 1905428 A | 1/2007 |
| CN | 101193421 A | 6/2008 |
| EP | 1915005 A2 | 4/2008 |
| EP | 1988648 A1 | 11/2008 |
| KR | 1020080078194 A | 8/2008 |
| RU | 2253947 C2 | 6/2005 |
| WO | 2008025233 A1 | 3/2008 |
| WO | 2009020213 A1 | 2/2009 |
| WO | 2009020423 A1 | 2/2009 |

OTHER PUBLICATIONS

3 GPP TS 36.321 V 8.4.0 (Release 8), Medium Access Control (MAC) protocol specification Dec. 2008, pp. 1-43.

(Continued)

*Primary Examiner* — Robert Wilson
(74) *Attorney, Agent, or Firm* — Oppedahl Patent Law Firm LLC

(57) ABSTRACT

The present invention discloses a method and terminal for selecting a random access resource, the method includes: the terminal receives the physical downlink control channel signaling sent by a system; the terminal determines the first subframe which meets a condition A and contains a random access resource from the subsequent subframes of the subframe receiving the physical downlink control channel signaling, the condition A is that the time difference between the first subframe and the subframe receiving the physical downlink control channel signaling is greater than or equal to k, k is the time delay defined by the physical layer of the terminal; and the terminal starts a selection on the subframe containing a random access source from the first subframe.

15 Claims, 4 Drawing Sheets

(56) References Cited

OTHER PUBLICATIONS

3 GPP TS 36.321 (Release 8), Physical layer procedures Dec. 2008, pp. 1-74.

International Search Report in international application No. PCT/CN2009/074208, mailed on Jan. 7, 2010.

English Translation of the Written Opinion of the International Search Authority in international application No. PCT/CN2009/074208, mailed on Jan. 7, 2010.

* cited by examiner

METHOD AND TERMINAL FOR SELECTING RANDOM ACCESS RESOURCE

TECHNICAL FIELD

The present invention relates to the filed of a cellular radio communication system, and in particular, to a method and terminal for selecting a random access resource when the terminal randomly accesses to a cellular radio communication system.

BACKGROUND

As shown in FIG. 1, a cellular radio communication system is mainly composed of a terminal, a base station and a core network. A network consisting of the base stations is known as a Radio Access Network (RAN), which is in charge of access stratum affairs, such as radio resource management. According to actual conditions, there may be a physical or logic connection between base stations. As shown in FIG. 1, there is a connection between base station 1 and base station 2 or between base station 1 and base station 3. Each base station may be connected with one or more Core Network (CN) nodes. The core network is in charge of non-access stratum affairs, such as is location update etc., and is an anchor point of a user interface. The terminal (or User Equipment, UE) refers to any device that can communicate with a cellular radio communication network, such as a mobile phone or a notebook.

A random access procedure is described in detail in a Long Term Evolution (LTE). A random access procedure of a physical layer mainly includes the transmission of a physical random access preamble and the receiving of a random access response. A Physical Random Access Channel (PRACH) is used for transmitting the physical random access preamble. Before sending the physical random access preamble, a terminal selects a PRACH resource. The PRACH resource herein is an uplink channel time-frequency domain radio resource, which occupies 6 RBs (radio block) in a frequency domain and 1-3 subframes in a time domain, and the duration occupied in the time domain is related to the format of the physical random access preamble sent by the terminal. The terminal selects a PRACH resource by selecting the positions of the first subframe of a PRACH resource in the time domain and the frequency domain. Two key configuration parameters related to this selection procedure consist of a PRACH configuration index and a PRACH mask index. The terminal can receive the PRACH configuration index via a system message or handover signaling, and the PRACH configuration index corresponds to the combination of a set of configuration parameters and indicates the following content: PRACH format, PRACH density (the number of the PRACHs configured in each radio frame), and the time domain position (in Frequency Division Duplexing (FDD), the index directly corresponds to the starting subframe number in the time domain of the PRACH) for the transmission of each PRACH, or the version number (in time division duplexing (TDD), the index indicates the version numbers of several different mapping modes in the time domain) of time domain configuration. For an LTE FDD system, at most one PRACH is configured in the frequency domain, at most 10 PRACHs may be contained in a radio frame, and the PRACHs are all separated in the time domain. All the PRACHs in the frequency domain are identical and are uniformly configured by the base station. For an LTE TDD system, at most 6 PRACHs may be contained in each radio frame, and the PRACHs are mapped first in the time domain and then in the frequency domain; when the time domain resource is not enough for bearing the configured PRACH density through a time domain multiplexing on the premise that the PRACHs are not overlapped in the time domain, multiple PRACHs are multiplexed in the frequency domain, and physical random access configuration tables of FDD and TDD systems are respectively given in the following Tables 1 and 2.

TABLE 1 physical random access configuration of an LTE FDD system

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

TABLE 2 physical random access configuration of an LTE TDD system

| PRACH Configuration Index | Preamble Format | Density Per 10 ms ($D_{RA}$) | Version ($r_{RA}$) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |

Providing that a configuration index is given and the subframes for transmitting PRACH are known, the UE indicates the available PRACH resource in one radio frame on the configuration index by using the PRACH mask index. In the case of a random access based on competition, the UE can automatically set the mask index to be 0, which means the UE is allowed to select all random access resources on the PRACH configuration index configured by the current cell; and in the case of a random access based on non-competition, the base station can designate a mask index. The examples of a mask index indicating a PRACH resource in an FDD system and a TDD system are given in Tables 3 and 5, wherein the PRACH index in the tables represents the relative sequence number of the first subframe on a random access resource in one radio frame. For the FDD, the PRACH index is determined according to the ascending sequence of the subframe numbers; and for the TDD, the PRACH index is determined according to the time domain firstly and then the frequency domain.

TABLE 3 a diagram of the corresponding relationship between
a PRACH resource index and a subframe in an FDD
(PRACH configuration index = 10)

| PRACH Mask Index | Allowed PRACH | Subframe |
|---|---|---|
| 0 | all | 2, 5, 8 |
| 1 | PRACH index 0 | 2 |
| 2 | PRACH index 1 | 5 |
| 3 | PRACH index 2 | 8 |

For the TDD, an uplink subframe and a downlink subframe exist simultaneously in one radio frame, while the PRACH resource exists only in the uplink subframe, thus, Uplink/Downlink (UL/DL) configurations of the radio frame must be taken into consideration. In Table 4, a terminal can obtain the uplink/downlink configurations of the radio frame via a system message or handover signaling. Additionally, the PRACH resource (having the frequency domain distribution as shown in FIG. 2) is identified by a quaternion ($f_{RA}, t_{RA}^0, t_{RA}^1, t_{RA}^2$), where $f_{RA}$ represents the position of a frequency domain and is valued in the range of [0, 1, 2, 3, 4, 5], $t_{RA}^0$ represents that the distribution of a time domain is in an odd subframe ($t_{RA}^0=2$), or an even subframe ($t_{RA}^0=1$), or both an odd subframe and an even subframe ($t_{RA}^0=0$); $t_{RA}^1$ represents that the time domain position of the PRACH of one frame is in the first half-frame ($t_{RA}^1=0$), or the last half-frame ($t_{RA}^1=1$); and $t_{RA}^2$ represents the offset position of a subframe in a half-frame with respect to the first uplink subframe and is valued in relation to the uplink/downlink configurations, and the PRACH is located in a Uplink Pilot Time Slot (UpPTS) if ($t_{RA}^2=*$).

TABLE 4

TDD uplink/downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 5

TDD mask index table
(UL/DL configuration 3 and PRACH configuration index = 18)

| PRACH Mask Index | Allowed PRACH | PRACH Resource |
|---|---|---|
| 0 | All | (0, 0, 0, 0), (0, 0, 0, 1), (0, 0, 0, 2), (1, 0, 0, 0), (1, 0, 0, 1), (1, 0, 0, 2), |
| 1 | PRACH Resource Index 0 | (0, 0, 0, 0) |
| 2 | PRACH Resource Index 1 | (0, 0, 0, 1) |
| 3 | PRACH Resource Index 2 | (0, 0, 0, 2) |
| 4 | PRACH Resource Index 3 | (1, 0, 0, 0) |
| 5 | PRACH Resource Index 4 | (1, 0, 0, 1) |
| 6 | PRACH Resource Index 5 | (1, 0, 0, 2) |

The designation of the mask index by a network mainly includes two cases: in one case of a handover procedure, the time for initiating a random access in a target cell is determined by various factors after the terminal receives a handover command, such as the processing time delay of an RRC layer, and there is no other limitation on the physical layer; and in the other case, there is downlink data arriving at a network side, if the network considers the terminal not in an uplink-synchronized state, the terminal is triggered by a Physical Downlink Control Channel (PDCCH) signaling to initiate a random access procedure, and there is a time delay requirement on the initiation of a random access after the terminal receives the PDCCH signaling. As the selection on a PRACH resource is determined by a Media Access Control (MAC) layer, a physical random access preamble cannot be sent by a physical layer if the MAC layer does not take the required time delay into consideration when selecting a PRACH resource.

SUMMARY

An object of the present invention is to provide a method and a terminal for selecting a random access resource to guarantee the success of a random access.

In order to solve the above-mentioned technical problem, the present invention provides a method for selecting a random access resource, which includes:

a terminal receives a physical downlink control channel signaling sent by a system;

the terminal determines, from among a plurality of subframes following a subframe in which the physical downlink control channel signaling is received, a first subframe which meets condition A and contains a random access resource, wherein condition A is that the time difference between the current subframe and the subframe in which the physical downlink control channel signaling is received is greater than or equal to k, and k is a time delay defined at a physical layer of the terminal; and the terminal selects, starting from the first subframe, one or more subframes each meeting condition A and containing a respective random access source.

Further, a Physical Random Access Channel (PRACH) mask index and a physical random access preamble index may be included in the physical downlink control channel signaling;

The first subframe containing a random access resource may be determined by a PRACH configuration index, the PRACH mask index and the physical random access preamble index, wherein the PRACH configuration index is acquired by the terminal from a system message or a handover signaling; and the range for the selection on the subframe containing a random access resource may be the first subframe.

Further, a PRACH mask index and a physical random access preamble index may be included in the physical downlink control channel signaling; and the subframe containing a random access resource may be determined by a PRACH configuration index, the PRACH mask index, the physical random access preamble index and an uplink/downlink configuration index, wherein the PRACH configuration index and the uplink/downlink configuration index are acquired by the terminal from a system message or a handover signaling.

Further, when the PRACH mask index is not equal to 0, the time range for the terminal to select the subframe containing a random access resource may be the first subframe; and when the PRACH mask index is equal to 0, the time range for the terminal to select the subframe containing a random access resource may be the first subframe and two successive subframes subsequent to the first subframe.

Further, assuming the subframe in which the pysical downlink control channel signaling is reeived has a subframe number m, and is located in a radio frame which has a frame number M, the first subframe has a subframe number n, and is located in a radio frame which has a frame number N, the first subframe further meets the following equation: $N=(M+\lfloor(m+k)/10\rfloor)\%1024$, $n=(m+k)\%10$.

Further, k may be equal to 6 milliseconds.

In order to solve the above-mentioned technical problem, the present invention further provides a terminal for selecting a random access resource, which comprises a receiving module, a subframe selecting module and a resource selecting module, wherein the receiving module, comprising circuitry, is arranged for receiving a physical downlink control channel signaling sent by a system;

the subframe selecting module is arranged for determining, from amoung a plurality of subframes following a subframe in which the physical downlink control channel signaling is received, a first subframe which meets condition A and contains a random access resource, wherein condition A is that the time difference between the current subframe and the subframe in which the physical downlink control channel signaling is received is greater than or equal to k, and k is the time delay defined at a physical layer of the terminal; and the resource selecting module is arranged for selecting, starting from the first subframe, one or more subframes each meeting condition A and containing a respective random access source.

Further, a PRACH mask index and a physical random access preamble index may be included in the physical downlink control channel signaling; and the receiving module may be further arranged for receiving a system message or handover signaling which includes a PRACH configuration index.

Further, the terminal may further comprise a storing module and an analyzing module, wherein the storing module is arranged for storing a PRACH configuration index table and a PRACH mask index table; and the analyzing module is arranged for determining the subframe containing a random access resource according to the physical downlink control channel signaling, the system message or handover signaling, and the storing module.

Further, the first subframe may be selected from the subframes containing a random access resource; and the range for the resource selecting module to select the subframe containing a random access resource may be the first subframe.

Further, a physical random access preamble index and a PRACH mask index may is be included in the physical downlink control channel signaling; and the receiving module may be further arranged for receiving a system message or handover signaling which includes a PRACH configuration index and an uplink/downlink configuration index.

Further, the terminal may further comprise a storing module and an analyzing module, wherein the storing module is arranged for storing a PRACH configuration table, a PRACH mask index table and an uplink/downlink configuration table; and the analyzing module is arranged for determining the subframe containing a random access resource according to the physical downlink control channel signaling, the system message or handover signaling, and the storing module.

Further, the first subframe may be selected from the subframes containing a random access resource;

when the PRACH mask index is not equal to 0, the time range for the resource selecting module to select the subframe containing a random access resource may be the first subframe; and when the PRACH mask index is equal to 0, the time range for the resource selecting module to select the subframe containing a random access resource may be the first subframe and two successive subframes subsequent to the first subframe.

Compared with the current technologies, the method and the terminal for selecting a random access resource take both the limitation of a PRACH configuration index and a PRACH mask index and the time delay limitation of a physical layer on a random access resource selection, an MAC layer makes a determination before determining a random access resource to avoid the collision in time delay with the physical layer, therefore, the present invention can guarantee the success of a random access.

DETAILED DESCRIPTION

In existing technologies, when a network side triggers a terminal to initiate a random access via a PDCCH signaling, a physical layer has requirements on the processing time delay of the terminal after receiving the PDCCH signaling. However, this limitation is not considered when a random access resource is selected in a high-level MAC layer protocol. The random access resource selection process of a high-level layer is as follows.

Assuming that the UE sends a physical random access preamble at a certain point (a subframe G in a radio frame M), the UE may select an available subframe containing PRACH (a first radio subframe of a PRACH resource) subsequent to the subframe, and then send the physical random access preamble on the PRACH resource. According to the foregoing description, the available PRACH resource in one radio frame should be subject to the limitation given by a PRACH configuration index and a PRACH mask index.

In a TDD system, if the PRACH mask index is 0, after the first subframe is designated by using the above-mentioned method, a terminal reselects a frequency domain in a time of a limited number of subframes according to an equal probability, and the reason for the reselection is that multiple subframes exist in the frequency domain in the time range of one subframe when the PRACH mask index is 0. Assuming that the sent physical random access preamble is determined by a network and the PRACH mask index is not 0, the terminal only makes the selection in the time range of the first subframe; and assuming that the physical random access preamble is determined by the terminal itself, the terminal makes the selection in a given subframe and two successive subframes subsequent to the given subframe.

It can be seen from the description of the physical layer and the high-level layer on the sending time of the physical random access preamble that when the physical random access preamble is configured by a network, the MAC layer only takes the limitation of the PRACH configuration index and the PRACH mask index on the selection process and ignores the time delay limitation of the physical layer. In the case of the arrival of downlink data, after the UE receives a PDCCH signaling, if the PRACH-containing subframe selected by the MAC layer is in the time delay (for example: 6 milliseconds) defined by the physical layer of the subframe receiving the PDCCH signaling, then the physical layer cannot send the downlink data, and consequentially, the transmission of a random access is failed.

The main idea of a method and terminal for selecting a random access resource in the present invention is to take the time delay defined by the physical layer of a terminal into consideration to guarantee the successful transmission of a random access simultaneously during selecting a random access resource.

Figure 1:
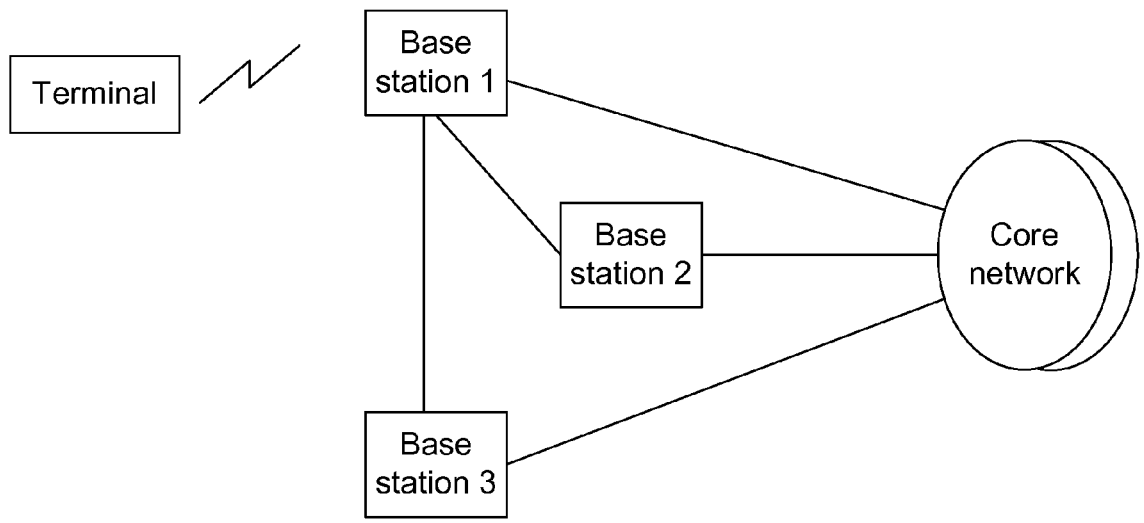
FIG. 1 is a structural diagram of an existing cellular radio communication system.
Figure 2:
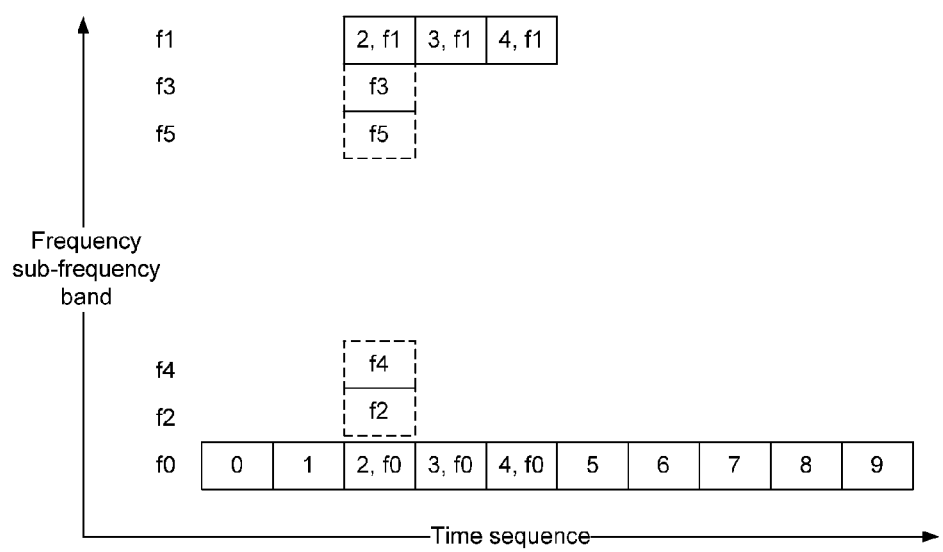
FIG. 2 is a diagram of frequency domain resource distribution of TDD-PRACHs.
Figure 3:
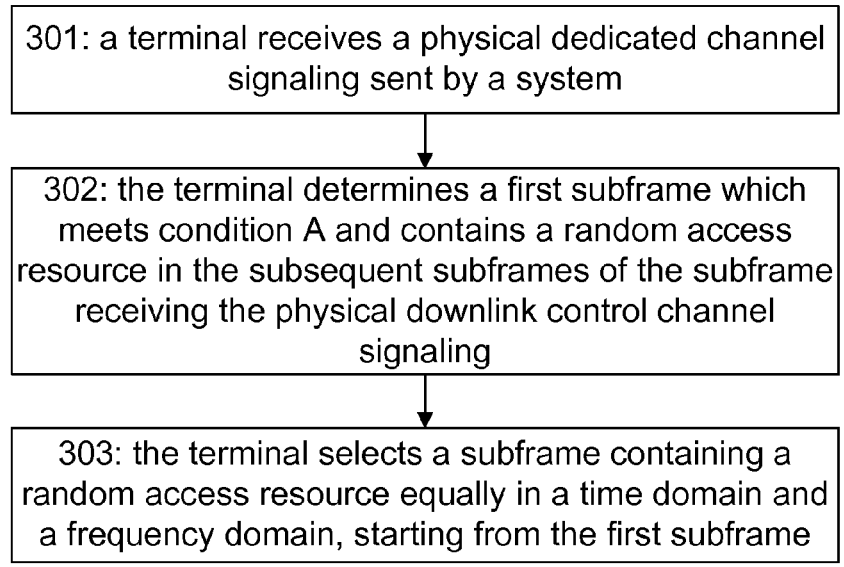
FIG. 3 is a diagram of a method for selecting a random access resource of the present invention.

As shown in FIG. 3, a method for selecting a random access resource in the present invention includes the following steps.

Step 301: a terminal receives a physical downlink control channel signaling sent by a system.

A PRACH mask index and a physical random access preamble index are included in the physical downlink control channel signaling.

Step 302: the terminal determines a first subframe which meets condition A and contains a random access resource in the subsequent subframes of the subframe receiving the physical downlink control channel signaling.

Condition A is that the time difference between the first subframe and the subframe receiving the physical downlink control channel signaling is greater than or equal to k, k is the time delay defined by a physical layer of the terminal and k is greater than or equal to 6 milliseconds for an LTE system; and each radio frame includes 10 subframes.

If the terminal receives a downlink signaling at some point (e.g. radio frame M, subframe m) and is required to initiate a random access procedure, the condition may also be determined by the following formula:

$$\text{frame number: } N = (M + \lfloor (m+k)/10 \rfloor) \% 1024,$$
$$\text{subframe number: } n = (m+k) \% 10$$

where $\lfloor \ \rfloor$ represents rounding down, % represents remainder calculation, k is the time delay defined by a physical layer, namely, the time difference between the first is PRACH-containing subframe selected by the terminal and the subframe of the terminal receiving the downlink signaling is equal to k subframes.

According to the above-mentioned formula, the subframe meeting condition A is the a subframe subsequent to subframe n of radio frame N.

The subframe sending the physical random access preamble should be the one containing a PRACH resource, for an FDD system, such a subframe is defined by a PARCH configuration index, a PRACH mask index and a physical random access preamble index that are configured by a current cell.

Wherein the PARCH configuration index is acquired by the terminal from a system message or a handover signaling.

For a TDD system, such a subframe is defined by a PARCH configuration index, a PRACH mask index, a physical random access preamble index and an uplink/downlink configuration index that are configured by a current cell.

Wherein the PARCH configuration index and the uplink/downlink configuration index are acquired by the terminal from a system message or a handover signaling.

Step 303: the terminal selects the subframe containing a random access resource equally in a time domain and a frequency domain, starting from the first subframe.

For a TDD system, if the PRACH mask index is not equal to 0, then the terminal makes the selection only in the time range of the first subframe; if the PRACH mask index is equal to 0, then the terminal makes a selection equally in a time domain and a frequency domain on the first subframe and two successive subframes subsequent to the first subframe, taking condition A and the requirement on the containing of a random access resource into consideration.

For an FDD system, the range for selecting a subframe containing a random access resource equally in a time domain and a frequency domain is the first subframe.

The process of selecting a subframe for sending a physical random access preamble is described in detail by referring to the following specific embodiments.

Embodiment 1

In an FDD system, PRACH configuration index=10, PRACH Mask Index=0, is preamble Index!=0

A PDCCH signaling triggers a random access procedure on subframe m of radio frame M, wherein m=1. If the PRACH configuration index is 10 and the PRACH Mask Index is 0 (referring to Table 1 and Table 3), then a physical random access preamble can be sent on subframes 2, 5 and 8.

The first subframe meeting condition A is determined by the following formula:

$$\text{frame number: } N=(M+\lfloor(1+6)/10\rfloor)\%1024=M;$$
$$\text{subframe number: } n=(1+6)\%10=7.$$

It can be seen from the above formula that subframe 7 of radio frame M and the subsequent subframes of subframe 7 can be used for sending a physical random access preamble.

Figure 4:
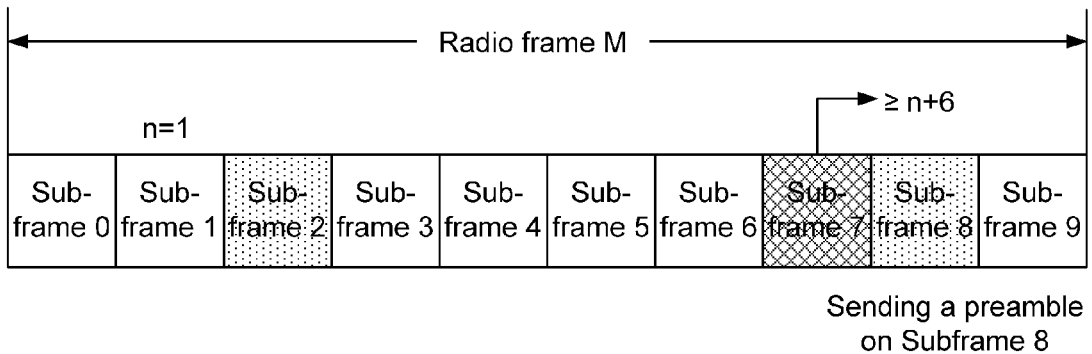
FIG. 4 is a structural diagram of a subframe sending a preamble in Embodiment 1.

For an FDD system, a physical random access preamble should be sent by the first subframe meeting all limiting conditions, i.e. subframe 8 of radio frame M, and the structure of the first subframe is shown in FIG. 4.

Embodiment 2

In an FDD system, PRACH configuration index=14, PRACH Mask Index=0, preamble Index=0

A PDCCH signaling triggers a random access procedure on subframe m of radio frame M, wherein m=1. If the PRACH configuration index is 14 and the PRACH Mask Index is 0, then a physical random access preamble can be sent on subframes 0-9.

The first subframe meeting condition A is determined by the following formula:

$$\text{frame number: } N=(M+\lfloor(1+6)/10\rfloor)\%1024=M;$$
$$\text{subframe number: } n=(1+6)\%10=7.$$

It can be seen from the above formula that subframe 7 of radio frame M and the subsequent subframes of subframe 7 can be used for sending a physical random access preamble.

Figure 5:
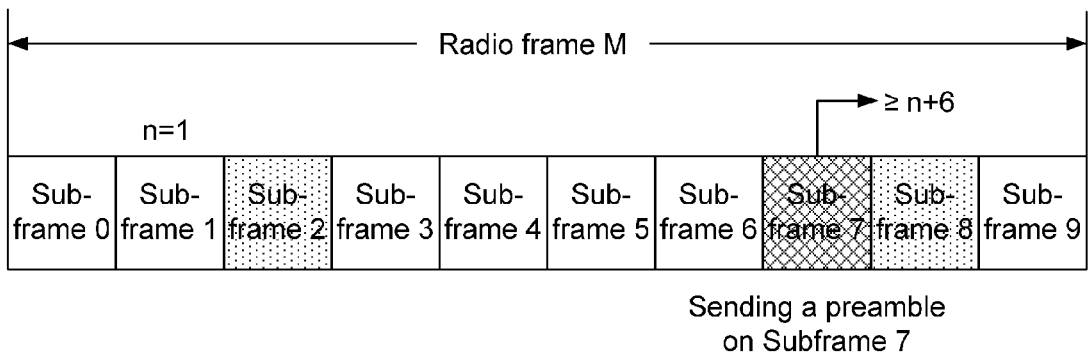
FIG. 5 is a structural diagram of a subframe sending a preamble in Embodiment 2.

For an FDD system, a physical random access preamble should be sent by the first subframe meeting all limiting conditions, i.e. subframe 7 of radio frame M, and the structure of the first subframe is shown in FIG. 5.

Embodiment 3

In a TDD system, UL/DL configuration=3, PRACH configuration index=18, PRACH Mask Index=0, preamble Index=0

A PDCCH signaling triggers a random access procedure on subframe n of radio frame M, wherein m=7. If the PRACH configuration index is 18, the PRACH Mask Index is 0, and UL/DL configuration=3 (referring to Tables 2, 3 and 4), then a physical random access preamble can be sent on subframes 2, 3 and 4 at frequencies of f0 and f1.

The first subframe meeting condition A is determined by the following formula:

$$\text{frame number: } N=(M+\lfloor(7+6)/10\rfloor)\%1024=M+1;$$
$$\text{subframe number: } n=(7+6)\%10=3.$$

It can be seen from the above formula that subframe 3 of radio frame M+1 and the subsequent subframes of subframe 3 can be used for sending a physical random access preamble.

Figure 6:
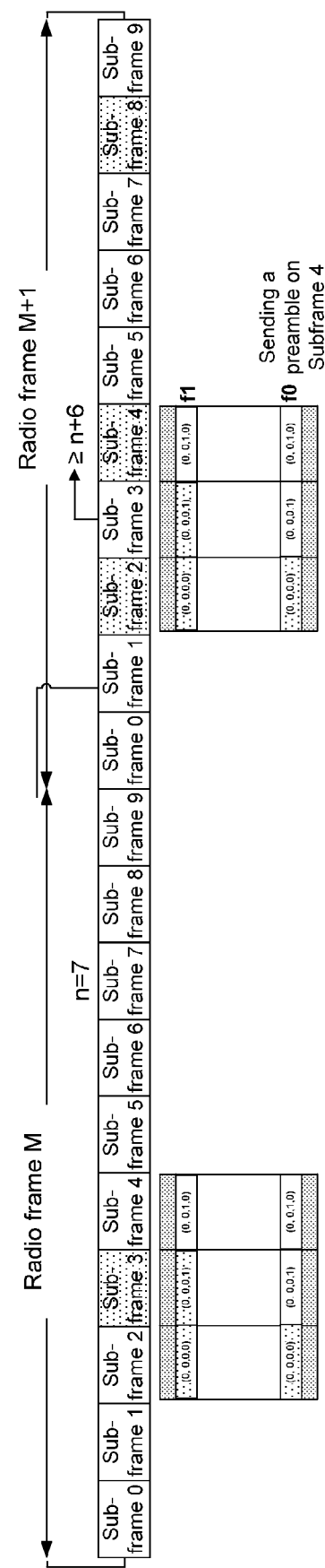
FIG. 6 is a structural diagram of a subframe sending a preamble in Embodiment 3.

Thus, the selected first subframe is subframe 3 of radio frame M+1. There are 4 subframes containing PRACH in frequency domains of subframes 3, 4 and 5, it can be known from the UL/DL configuration=3 that subframe 5 contains no PRACH, the UE can randomly select one of the four subframes containing PRACH on subframes 3 and 4, for example, a subframe on subframe 4 having frequency of f0, then the terminal sends a physical random access preamble on the PRACH of subframe 4 of radio frame M+1 having frequency of f0, the structure of the subframe is shown in FIG. 6.

Figure 7:
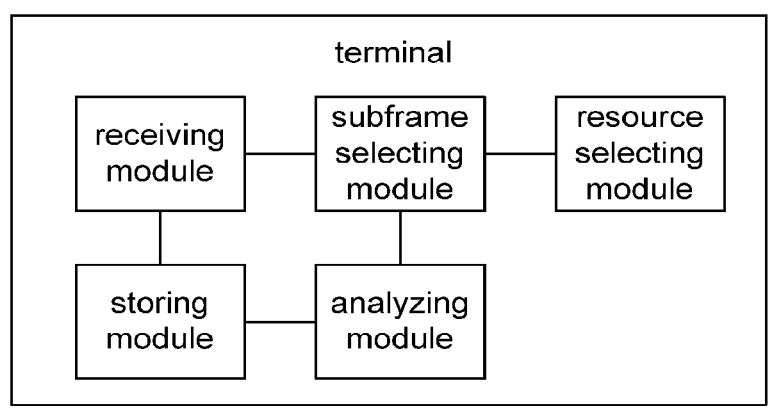
FIG. 7 is a functional block diagram.

FIG. 7 is a functional block diagram showing a receiving module, a storing module, a subframe selecting module, an analyzing module, and a resource sharing module.

In order to realize the above method, the present invention further provides a terminal for selecting a random access resource, which includes a receiving module, a storing module, an analyzing module, a subframe selecting module and a resource selecting module, wherein the receiving module is arranged for receiving a physical downlink control channel signaling sent by a system and a system message or handover signaling;

a PRACH mask index and a physical random access preamble index are included in the physical downlink control channel signaling;

for an FDD system, a PRACH configuration index is included in the system message or handover signaling;

for a TDD system, a PRACH configuration index and an uplink/downlink configuration index are included in the system message or handover signaling.

The storing module is arranged for storing the PRACH configuration table, the PRACH mask index table and the uplink/downlink configuration table;

The analyzing module is arranged for determining a subframe containing a random access resource according to the physical downlink control channel signaling, the system message or handover signaling, and the storing module; for an FDD system, the subframe containing a random access resource is defined by the PRACH configuration index, the PRACH mask index and the physical random access preamble index that are configured by a current cell.

For a TDD system, the subframe containing a random access resource is defined by the PRACH configuration index, the PRACH mask index, the physical random access preamble index and an uplink/downlink configuration index that are configured by a current cell.

Before inquiring the storing module, the terminal needs to determine whether the physical random access preamble index is 0, if yes, then the random access is indicated based on competition, then the terminal modifies the physical random access preamble index to be 0, regardless of the initial value of the physical random access preamble index; otherwise, the terminal inquires the physical random access preamble index table according to the initial value of the physical random access preamble index in a downlink signaling.

The subframe selecting module is arranged for determining a first subframe which meets condition A and contains a random access resource from the subsequent subframes of the subframe receiving the physical downlink control channel signaling, wherein condition A is that the time difference between the first subframe and the subframe receiving the physical downlink control channel signaling is greater than or equal to k, and k is the time delay defined by a physical layer of the terminal and k is greater than or equal to 6 milliseconds;

the resource selecting module is arranged for selecting a subframe containing a random access resource equally in a time domain and a frequency domain from the first subframe.

For a TDD system, if the PRACH mask index is not equal to 0, then the terminal makes the selection only in the time range of the first subframe; if the PRACH mask index is equal to 0, then the terminal makes a selection equally in a time domain and a frequency domain on the first subframe and two successive subframes subsequent to the first subframe, taking condition A and the requirement on the containing of a random access resource into consideration.

For an FDD system, the range for the resource selecting module to select the subframe containing a random access resource equally in a time domain and a frequency domain is the first subframe.

The functions of the receiving module, the storing module and an inquiring module are realized in the physical layer, and the functions of the subframe selecting module and the resource selecting module are realized in an MAC layer.

The method and the terminal for selecting a random access resource of the present invention take both the limitation of the PRACH configuration index and the PRACH mask index and the time delay limitation of the physical layer on a random access resource selection, the MAC layer makes a determination before determining a random access resource to avoid the collision in time delay with the physical layers, therefore, the present invention can guarantee the success of a random access.

The above descriptions are only preferred embodiments of the present invention, rather than limit the present invention, as to those technicians skilled in the art, various modification and changes can be made to the present invention. Any modification, equivalent substitute and improvement within spirit and principle of the present invention are in protection scope of the present invention.

INDUSTRIAL APPLICABILITY

Compared with the current technology, the method and the terminal for selecting random access resource take both the limitation of the PRACH configuration index and the PRACH mask index on the selection process and the time delay limitation of the physical layer on the random access resource selection, the MAC layer makes a determination before determining a random access resource to avoid the collision in time delay with the physical layers, therefore, the present invention can guarantee the is success of a random access.

What is claimed is:

1. A method for selecting a random access resource, the method comprising:
   receiving, by a terminal, a physical downlink control channel signaling sent by a system;
   determining, by the terminal, from among a plurality of subframes following a subframe in which the physical downlink control channel signaling is received, a first subframe which meets condition A and contains a random access resource, wherein
   condition A is that the time difference between the current subframe and the subframe in which the physical downlink control channel signaling is received is greater than or equal to k, and k is a time delay defined at a physical layer of the terminal; and
   selecting, by the terminal, starting from the first subframe, one or more subframes each containing a respective random access source,
   wherein assuming the subframe in which the physical downlink control channel signaling is received has a subframe number m, and is located in a radio frame which has a frame number M, the first subframe has a subframe number n, and is located in a radio frame which has a frame number N, the first subframe further meets the following equation:

$N=(M+\lfloor(m+k)/10\rfloor)\%1024, n=(m+k)\%10.$

2. The method according to claim 1, wherein
   a Physical Random Access Channel (PRACH) mask index and a physical random access preamble index are included in the physical downlink control channel signaling;
   the first subframe containing the random access resource is determined by a PRACH configuration index, the PRACH mask index and the physical random access preamble index, wherein the PRACH configuration index is acquired by the terminal from a system message or a handover signaling; and
   the range for the selection on the subframe containing a random access resource is the first subframe.

3. The method according to claim 2, wherein k is equal to 6 milliseconds.

4. The method according to claim 1, wherein
   a PRACH mask index and a physical random access preamble index are included in the physical downlink control channel signaling; and
   the subframe containing a random access resource is determined by a PRACH configuration index, the PRACH mask index, the physical random access preamble index and an uplink/downlink configuration index, wherein the PRACH configuration index and the uplink/downlink configuration index are acquired by the terminal from a system message or a handover signaling.

5. The method according to claim 4, wherein
   when the PRACH mask index is not equal to 0, the time range for the terminal to select the subframe containing a random access resource is the first subframe; and
   when the PRACH mask index is equal to 0, the time range for the terminal to select the subframe containing a random access resource is the first subframe and two successive subframes subsequent to the first subframe.

6. The method according to claim 5, wherein k is equal to 6 milliseconds.

7. The method according to claim 4, wherein k is equal to 6 milliseconds.

8. The method according to claim 1, wherein k is equal to 6 milliseconds.

9. A terminal for selecting a random access resource, the terminal comprising: a memory storing instructions for a receiving module, a subframe selecting module and a resource selecting module, wherein a processor executing the stored instructions for the receiving module receives a physical downlink control channel signaling sent by a system;

said processor executing the stored instructions for the subframe selecting module determines from among a plurality of subframes following a subframe in which the physical downlink control channel signaling is received, a first subframe which meets condition A and contains a random access resource, wherein condition A is that the time difference between the current subframe and the subframe in which the physical downlink control channel signaling is received is greater than or equal to k, and k is the time delay defined at a physical layer of the terminal; and said processor executing the stored instructions for the resource selecting modules selects, starting from the first subframe, one or more subframes each containing a respective random access source, wherein assuming the subframe in which the physical downlink control channel signaling is received has a subframe number m, and is located in a radio frame which has a frame number M, the first subframe has a subframe number n, and is located in a radio frame which has a frame number N, the first subframe further meets the following equation:

$$N=(M+\lfloor (m+k)/10 \rfloor)\%1024, n=(m+k)\%10.$$

10. The terminal according to claim 9, wherein a PRACH mask index and a physical random access preamble index are included in the physical downlink control channel signaling; and said processor executing the stored instructions for the receiving module further receives a system message or handover signaling which includes a PRACH configuration index.

11. The terminal according to claim 10, further comprising a storage, wherein the storage is arranged for storing a PRACH configuration table and a PRACH mask index table; and wherein the memory further stores instructions for an analyzing module, and said processor executing the stored instructions for the analyzing module determines the subframe containing a random access resource according to the physical downlink control channel signaling, the system message or handover signaling, and the storing module.

12. The terminal according to claim 11, wherein the first subframe is selected from the subframes containing a random access resource; and the range for the resource selecting module to select the subframe containing a random access resource is the first subframe.

13. The terminal according to claim 9, wherein a physical random access preamble index and a PRACH mask index are included in the physical downlink control channel signaling; and said processor executing the stored instructions for the receiving module further receives a system message or handover signaling which includes a PRACH configuration index and an uplink/downlink configuration index.

14. The terminal according to claim 13, further comprising a storage, wherein the storage is arranged for storing a PRACH configuration table and a PRACH mask index table; and wherein the memory further stores instructions for an analyzing module, and said processor executing the stored instructions for the analyzing module determines the subframe containing a random access resource according to the physical downlink control channel signaling, the system message or handover signaling, and the storing module.

15. The terminal according to claim 14, wherein the first subframe is selected from the subframes containing a random access resource;

when the PRACH mask index is not equal to 0, the time range for the resource selecting module to select the subframe containing a random access resource is the first subframe; and when the PRACH mask index is equal to 0, the time range for the resource selecting module to select the subframe containing a random access resource is the first subframe and two successive subframes subsequent to the first subframe.

* * * * *